United States Patent
Reiss et al.

(10) Patent No.: US 10,022,755 B2
(45) Date of Patent: Jul. 17, 2018

(54) SYSTEM FOR PIPE TREATMENT

(71) Applicant: Airbus Operations GmbH, Hamburg (DE)

(72) Inventors: Matthias Reiss, Hamburg (DE); Ole Becker, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 566 days.

(21) Appl. No.: 14/165,781

(22) Filed: Jan. 28, 2014

(65) Prior Publication Data

US 2014/0158219 A1  Jun. 12, 2014

Related U.S. Application Data

(63) Continuation of application No. PCT/EP2012/064671, filed on Jul. 26, 2012.
(Continued)

(30) Foreign Application Priority Data

Jul. 28, 2011 (DE) ............ 10 2011 108 884

(51) Int. Cl.
*B01J 49/00* (2017.01)
*B08B 9/032* (2006.01)
(Continued)

(52) U.S. Cl.
CPC ............ *B08B 9/032* (2013.01); *B08B 9/0325* (2013.01); *B64D 11/02* (2013.01); *B64D 11/04* (2013.01);
(Continued)

(58) Field of Classification Search
None
See application file for complete search history.

(56) References Cited

U.S. PATENT DOCUMENTS 4,853,117 A * 8/1989 Burrows ............... B01D 61/10
  210/110
5,970,528 A   10/1999 Shirai et al.
(Continued)

FOREIGN PATENT DOCUMENTS

DE    38 38 046 A1     5/1995
DE    102009009938 A1  8/2010
FR    2864530 A1       7/2005

OTHER PUBLICATIONS

European Patent Office, European Patent Search Report for Application No. PCT/EP2012/064671 dated Oct. 15, 2013.
(Continued)

*Primary Examiner* — Richard C Gurtowski
(74) *Attorney, Agent, or Firm* — Lorenz & Kopf, LLP

(57) ABSTRACT

A pipe treatment system for a supply unit is provided. The pipe treatment system comprises a fresh water inlet pipe, a tap for fresh water, a controllable tap valve, and a control device for the pipe treatment control system. The controllable tap valve is arranged between the fresh water inlet pipe and the tap for fresh water. The control device for the pipe treatment control system is connected to the controllable tap valve so as to place the controllable tap valve in a pipe treatment state when there is a pipe treatment signal at the control device, so as to provide a more reliable pipe treatment system, for example for disinfection or descaling.

15 Claims, 2 Drawing Sheets

Related U.S. Application Data

(60) Provisional application No. 61/512,745, filed on Jul. 28, 2011.

(51) Int. Cl.
    *B64D 11/02*     (2006.01)
    *B64D 11/04*     (2006.01)
    *F24D 19/00*     (2006.01)
    *E03B 7/00*     (2006.01)

(52) U.S. Cl.
    CPC ........ *F24D 19/0092* (2013.01); *B08B 9/0323* (2013.01); *C02F 2201/001* (2013.01); *C02F 2307/14* (2013.01); *E03B 7/006* (2013.01); *Y10T 137/4245* (2015.04)

(56) References Cited

U.S. PATENT DOCUMENTS

2006/0289455 A1* 12/2006 Nakamura .............. D06F 39/04
                                                            219/494
2009/0039306 A1    2/2009 Dorsey et al.

OTHER PUBLICATIONS

German Patent Office, Office Action for DE 10 2011 108 884.2, dated May 29, 2012.

* cited by examiner

SYSTEM FOR PIPE TREATMENT

CROSS-REFERENCE TO RELATED APPLICATIONS

This is a continuation of International Application No. PCT/EP2012/064671, filed Jul. 26, 2012, which claims priority to German Patent Application No. 10 2011 108 884.2, filed Jul. 28, 2011 and U.S. Provisional Application No. 61/512,745, filed Jul. 28, 2011, which are each incorporated herein by reference in their entirety.

TECHNICAL FIELD

The technical field relates to a system for automated pipe treatment, in particular a system for automated disinfection or descaling of on-board kitchens in an aircraft by means of a data network.

BACKGROUND

Thus far, on-board kitchens of aircraft have been disinfected and descaled manually. For the disinfection or descaling, an appropriate solution of disinfection agent or descaling agent is introduced into the fresh water system in the aircraft from the outside, via the fresh water service panel. So as to provide that all of the fresh water consumers, such as galley modules, and water-bearing on-board kitchens and toilets or electrical galley inserts (GAIN), such as water heaters, are flushed, all of the shut-off valves, which are each located on the input side of the galley module or each at an on-board kitchen or a toilet, have to be opened for this purpose, in some cases by hand, and at least one water consumer, for example a water tap in the galley, has to be opened. It is completely impossible to include different galley inserts together in this type of disinfection or descaling, and they have to be removed and disinfected or descaled separately in a maintenance workshop. This method involves a considerable amount of work. In addition, it is susceptible to errors as a result of the large number of manual process steps, and this increases the risk of incomplete disinfection or descaling.

In addition, other objects, desirable features and characteristics will become apparent from the subsequent summary and detailed description, and the appended claims, taken in conjunction with the accompanying drawings and this background.

SUMMARY

According to various teachings of the present disclosure, provided is a reliable pipe treatment system, for example for disinfection or descaling.

In accordance with one embodiment of the present disclosure, a pipe treatment system for a supply unit is provided, the pipe treatment system comprising a fresh water inlet pipe, a tap for fresh water, a controllable tap valve, and a control device for the pipe treatment control system, the controllable tap valve being arranged between the fresh water inlet pipe and the tap for fresh water, the control device for the pipe treatment control system being connected to the controllable tap valve so as to place the tap valve in a pipe treatment state when there is a pipe treatment signal at the control device.

In this way it is possible, on the basis of the control device which controls the controllable tap valve when there is a corresponding signal, to place the tap valve in a pipe treatment state, which makes it possible for the supply unit to be rinsed reliably with for example a disinfection solution or a descaling solution. For this purpose, a pipe treatment signal may for example be sent to the control device, or else be triggered manually, the control device subsequently for example opening the controllable tap valve, in such a way that a disinfection or descaling solution is introduced and flows through the fresh water inlet pipe to the tap for fresh water, and in this way disinfects or descales the fresh water inlet pipe as well as the tap for fresh water and the controllable tap valve. In this context it is of particular significance that the disinfection solution can flow along the entire travel path of the fresh water, since this is the only way of providing that all of the parts which come into contact with the fresh water can be disinfected or descaled reliably. In particular, it is no longer necessary for a correspondingly controllable tap valve to be activated manually. The controllable tap valve can thus be arranged for example even in inaccessible places in the tap, since henceforth it is no longer necessary to open the controllable tap valve manually. Further, as a rule, it is also no longer possible to forget to open the corresponding controllable tap valve, since it is now opened by the control device for the pipe treatment control system.

In accordance with one embodiment of the present disclosure, the pipe treatment system further comprises a bypass pipe and a controllable bypass valve arrangement, the bypass pipe being arranged substantially parallel to at least a partial length of the fresh water inlet pipe, the bypass valve arrangement being configured and controllable in such a way that a liquid feed can be bypassed through the bypass pipe at the partial length of the fresh water inlet, the control device for pipe treatment control being connected to the controllable bypass valve arrangement in such a way as to place the bypass valve arrangement in a pipe treatment state when there is a pipe treatment signal at the control device, so as to bypass a liquid through the bypass pipe at the partial length of the fresh water inlet pipe.

In this way it is possible to exclude selected points or sections of the fresh water supply line from the flushing with a pipe treatment agent, for example a disinfection or descaling agent, if there are means in this region which would be damaged by a corresponding pipe treatment agent. For example, special filter elements which would otherwise for example be attacked or damaged by the disinfection agent or the descaling agent can be circumvented in this way. In these regions, disinfection may also be provided in a different manner, for example by means of a corresponding antibacterial coating of the pipes or the sensitive elements, in such a way that disinfection is not required in this region. Of course, it is also possible, for example in a multi-stage disinfection process, for the bypass pipe to be circumvented only during one disinfection stage, whilst it is flushed with for example another disinfection agent in a second disinfection stage, if for example the corresponding element is inert towards the first disinfection agent, but not towards the second disinfection agent. In the case of circumvention via the bypass pipe, a partial length of the fresh water inlet pipe is circumvented in which the correspondingly sensitive element may be arranged.

In accordance with one embodiment of the present disclosure, the bypass valve arrangement comprises a first bypass valve and a second bypass valve, the first bypass valve connecting the bypass pipe to the fresh water inlet pipe at a first point thereof and the second bypass valve connecting the bypass pipe to the fresh water inlet pipe at a second point thereof.

In this way, it can be achieved that as a result of the first bypass valve and the second bypass valve, if there is circumvention of a partial portion of the fresh water supply, this partial region of the fresh water inlet pipe is shut off completely by the first and the second bypass valve, in such a way that disinfection agent or descaling agent cannot flow backwards into this partial region even as a result of a diffusion process. In other words, if there is circumvention of the partial region or the partial pipe region of the fresh water supply pipe, hermetic sealing is possible, whilst if fresh water is flowing through, the bypass pipe can be shut off completely, in such a way that a defined liquid connection and also liquid separation can be ensured.

In accordance with one embodiment of the present disclosure, the pipe treatment system further comprises a ventilation valve, the ventilation valve being arranged in a branch of the fresh water inlet pipe, which branch is arranged parallel to a branch of the fresh water inlet pipe in which branch the tap valve is positioned, the ventilation valve being configured for bleeding of the fresh water inlet pipe.

In this way, the fresh water branch can be aerated and bled accordingly, and this is of particular significance in the case where the fresh water inlet pipe is to be emptied completely via a discharge valve so as to prepare the supply means for example for a disinfection or descaling process. Further, the ventilation valve can be used so as to discharge the disinfection agent or descaling agent which is present in the pipe system completely in advance, before subsequently rinsing with fresh water. In this way, the necessary amount of rinsing water, which in general comprises fresh water, can be reduced. This is of particular significance for regions in which no fresh water is available externally, and it is necessary to resort to the limited fresh water reservoir of an aircraft. Further, with this measure the number of rinsing processes, the amount of rinsing water and thus the maintenance time can be reduced.

In accordance with one embodiment of the present disclosure, the control device comprises a subordinate control device, which is allocated to the tap, the tap valve being connected to and controllable by the subordinate control device in such a way that the tap valve is opened for a particular duration and to a particular degree, in accordance with an opening pattern. In this way, the subordinate control device can carry out the actual control in accordance with the opening pattern, the control device merely passing the triggering of the disinfection process to the subordinate control device. In this way, the subordinate control device can take into account the peculiarities of the tap, for example, if there are different taps, in particular in relation to the position or inlet length thereof, in such a way that a corresponding opening pattern, which provides a relatively long flow, can be selected for a correspondingly longer inlet. Equally, the type of the tap valve may already be stored in the subordinate control device. For example, tap valves having only two states, that is to say open or closed, may be provided, for example in a toilet flush or in a hand basin in a toilet installation, whilst in other taps a variable withdrawal amount may also be provided. In this latter case, it is expedient also to maintain the different opening degrees for particular periods during the disinfection or descaling process, in such a way that the valve can be reliably disinfected and descaled in all of the positions of the valve geometry.

In accordance with one embodiment of the present disclosure, the pipe treatment system comprises a plurality of taps and a plurality of controllable tap valves, each one of the plurality of controllable tap valves being arranged between the fresh water inlet pipe and a correspondingly associated one of the plurality of taps for fresh water, the control device comprising a plurality of subordinate control devices, one of the plurality of subordinate control devices being assigned to each of a plurality of taps, the respective tap valve being connected to and controllable by the respective subordinate control device in such a way that the respective tap valve is opened for a particular duration and to a particular degree in accordance with an opening pattern which is stored in the respective subordinate control device.

In this way, the control device can initiate a disinfection or descaling process, the corresponding subordinate control device being able to specify a corresponding opening pattern, in accordance with which the valve opens to a particular degree for the predetermined duration, in each of the plurality of taps, taking into account the type and functionality of the tap and of the appropriate pipe, in particular the length thereof.

In accordance with one embodiment of the present disclosure, the tap comprises a temperature control device, the temperature-control device being connected to and controllable by the control device in such a way that the temperature-control device is deactivated if there is a pipe treatment signal.

In this way, it can be ensured that as a result of an uncontrolled temperature for example a disinfection and descaling agent acts particularly rapidly or particularly slowly or does not act at all. For example, in disinfection and descaling agents, the agent may become particularly aggressive at a correspondingly increased temperature, and may for example damage the means through which it flows if there is a disproportionately long action time. It is therefore expedient and sometimes even necessary for these temperature-control devices to be deactivated selectively, in such a way that no uncontrolled temperature control of a disinfection or descaling agent occurs. This temperature-control device may for example be a heating device, but may also be a cooling device.

In accordance with one embodiment of the present disclosure, the control device comprises a logging device, which can display a progression of control signals over time.

In this way, as a result of the operational connection between the logging device and the control device, the treatment process can be logged, in such a way that it can subsequently be called up for corresponding monitoring. In this way, the disinfection process also remains reproducible long after the completion of said disinfection process. This is of significance for the ability to monitor the treatment process, as well as for tracing in the case of liability issues resulting from a soiled water pipe.

In accordance with one embodiment of the present disclosure, at least one of the valves out of the first bypass valve, the second bypass valve and the tap valve comprises a valve-state detection means, which is connected to the control device, the control device comprising a logging unit which can display and register, respectively, a progression of valve states over time.

In this way, it is possible for example to display not only the progression of control signals over time, but also the correspondingly associated valve states, in such a way that it can be ensured that the valves are not only being controlled, but have also actually opened or closed.

In accordance with one embodiment of the present disclosure, a pipe treatment sequence may be stored in the control device, which automatically controls the progression over time of valve opening degrees of the bypass valve device and the tap valve when there is a pipe treatment signal.

In this way, the control device no longer has to be controlled with a disinfection pattern or descaling pattern, but may merely receive a start signal and thus carry out the actual treatment, for example disinfection or descaling, autonomously.

In accordance with one embodiment of the present disclosure, the pipe treatment system comprises a detection means, which is configured so as to detect the presence of a pipe treatment agent in the fresh water inlet pipe, and to transmit a pipe treatment signal to the control device in response to the presence of a pipe treatment agent.

In this way, if for example there is a failure to activate the pipe treatment system, it can be activated automatically when a treatment agent is detected. A corresponding detection means may for example be configured for various pipe treatment agents, in such a way that even if for example a disinfection agent is unintentionally introduced into the fresh water supply system, said system immediately detects the presence of the disinfection agent and automatically places the supply unit in a pipe treatment state.

In accordance with one embodiment of the present disclosure, the pipe treatment system is configured for a pipe treatment with at least one of a disinfection agent and a descaling agent.

In accordance with one embodiment of the present disclosure, an aircraft comprising a pipe treatment system according to above-described embodiments is provided, and further comprises at least one supply unit, the supply unit being a unit from the group comprising a kitchen installation, a toilet installation and a bath installation.

In accordance with one embodiment of the present disclosure, a method for pipe treatment in a supply unit is provided, the method comprising detecting a pipe treatment signal and controlling a plurality of controllable tap valves on the basis of the detected pipe treatment signal, so as to place each of the tap valves in a pipe treatment state, the respective tap valve being controlled in such a way that the respective tap valve is opened for a particular duration and to a particular degree in accordance with a respective opening pattern.

In accordance with one embodiment of the present disclosure, a computer program is specified, and is configured to carry out the method according to the various teachings of the present disclosure when it is executed by a processor.

In accordance with one embodiment of the present disclosure, a computer-readable medium is specified, on which the computer program according to various embodiments is stored.

It should be noted that the embodiments of the present disclosure which are described in the following relate equally to the device, the method, the computer program and the computer-readable storage medium.

The individual specified features may of course also be combined with one another, and in some cases, advantageous effects which go beyond the sum of the individual effects may also occur as a result.

A person skilled in the art can gather other characteristics and advantages of the disclosure from the following description of exemplary embodiments that refers to the attached drawings, wherein the described exemplary embodiments should not be interpreted in a restrictive sense.

BRIEF DESCRIPTION OF THE DRAWINGS

The various embodiments will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Figure 1:
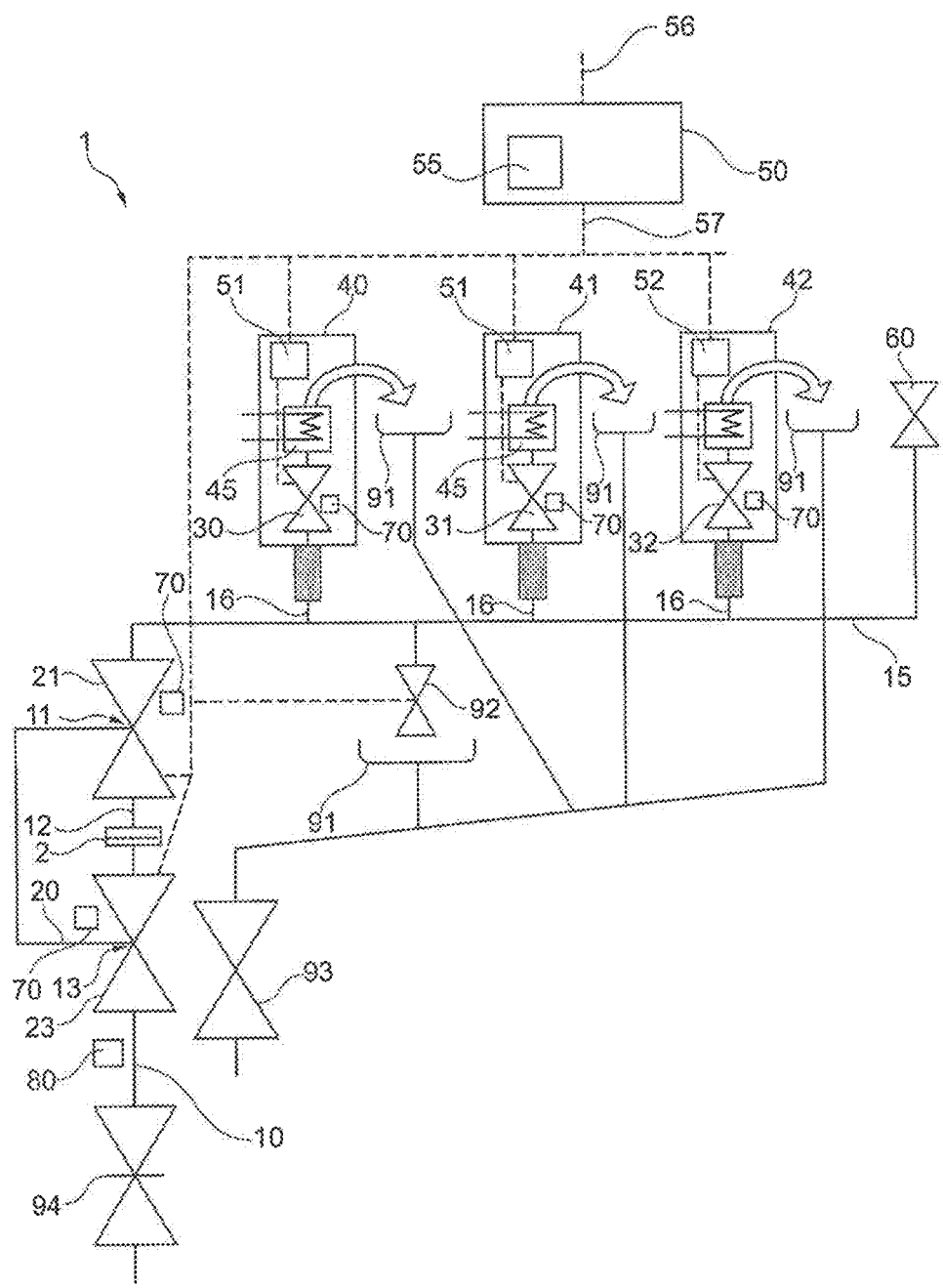
FIG. 1 shows an exemplary arrangement of a pipe treatment system according to the various teachings of the present disclosure.

FIG. 1 shows an exemplary embodiment of a structure of a pipe treatment system according to the various teachings of the present disclosure, with which both disinfection and descaling can be carried out. The pipe system substantially comprises an inlet branch 10, via which fresh water is guided to the corresponding taps 40, 41, 42, whilst the waste water is collected by means of corresponding waste water tanks or collection points 91 and can be removed via an outlet or waste water pipe 95. In the fresh water inlet branch 10, water filters 2 may for example be arranged, so as to ensure that for example particles are filtered out of the fresh water and thus do not reach the taps 40, 41, 42. In the fresh water inlet pipe 10, a stop valve 94 may for example be arranged, and may for example be fitted as a manual stop valve. The fresh water inlet pipe 10 subsequently branches into various individual inlets 16 to the taps 40, 41, 42. Furthermore, a further parallel branch 15 may be provided, at the end of which for example a ventilation and bleeder valve 60 may be arranged so as to aerate and bleed the fresh water inlet pipe. In the taps 40, 41, 42, for example tap valves 30, 31, 32 may be provided, with which the corresponding tap 40, 41, 42 can be actuated. Furthermore, a temperature-control device 45, with which the water can for example be heated or else cooled, may be provided in the taps.

Throughout the pipe treatment, for example disinfection or else descaling, it must be ensured that any sensitive devices, which can be attacked by for example a disinfection agent or a descaling agent, no longer comes into contact with the corresponding disinfection or descaling solution. Until now, it has been necessary for elements of this type, such as inlet-side water filters 2, to be removed. It further must be ensured that any temperature-control devices, such as water-heating kitchen appliances or even coolers 45, are not switched on, so as to avoid corrosion of the appliances. Until now, a lot of time has been expended because the water-bearing kitchen appliances, which when switched off are decoupled on the inlet side from the fresh water system by means of valve, and thus may not be filled with for example a disinfection solution, had to be removed for the purpose of the disinfection or descaling, and subsequently had to be disinfected or descaled by a special procedure while removed. Until now, it was thus necessary to open the manual shut-off valves and to allow the disinfection solution to flow into the water pipe of the on-board kitchen as a result of the applied input pressure, in such a way that air was able to escape through a bleeder valve. Then, to enable the disinfection solution to flow through, each water tap was opened manually, so as to allow a particular amount of disinfection solution to flow out. Subsequently, the input-side shut-off valves of the on-board kitchen had to be closed manually, and the fresh water system had to be filled again with disinfection solution to the maximum fill level, in such a way that the disinfection solution was able to act for a particular time in the water pipes before the entire system was drained via the drain valve. For this purpose, the shut-off valve of each on-board kitchen had to be reopened manually. The entire procedure was generally repeated one or more times, and subsequently the entire freshwater system was rinsed repeatedly. For this purpose, in principle the same manual operating steps were necessary as in the disinfection procedure. Before the system was set in operation, the corresponding sensitive components, such as input-side water filters, had to be re-installed.

However, these actions are very labor-intensive and time-consuming, and therefore lead to increased maintenance times for the aircraft on the ground and thus to considerable costs for the maintenance. In addition, these operating processes are susceptible to errors, and error tracing is often not possible as a result of the manual actuation. Further, there was the risk that the correct sequence of the process steps would not be observed properly, and the water quality therefore suffered.

This is remedied by the device according to the present disclosure in accordance with FIG. 1, which provides a water supply system comprising a pipe treatment system and in which a large number of manual steps are unnecessary. For this purpose, for example a control device 50 is provided, and takes on, in an automated manner, a large proportion of the steps which until now were carried out manually, and thus on the one hand ensures that the sequence of steps which are to be carried out manually is correctly observed, and on the other hand offers the possibility of correspondingly monitoring and logging these steps, for example by means of a logging device 55 which is provided in the control device. It should be noted that the logging device 55 may also be provided at a different location. It is thus now possible to control the control device merely by means of a corresponding signal line 56 comprising a signal which signals to the control device that a pipe treatment is to be carried out, and optionally what type of pipe treatment is to be carried out. In this context, it is in principle possible that different types of pipe treatment may also require different sequences or time periods for the pipe treatment process. For this purpose the control device 55 provides, via a corresponding signal line 57, control signals to the valves of the fresh water supply, so as to open or shut these valves in the corresponding sequence and for the corresponding periods for a corresponding degree of opening. In this context, a subordinate control device 51, 52 may also be provided, for example on the taps 40, 41, 42, and for example takes into account the peculiarities of the corresponding taps, so as to be able in this way to carry out a further detailed control of the corresponding tap, which may be specified for example by means of the different type of the tap or the different length of the inlet. The corresponding subordinate control device 51, 52 subsequently takes on, for the corresponding tap 40, 41, 42, corresponding control of the tap valve 30, 31, 32 and optionally also control or deactivation of the temperature-control device 45. Moreover, the control device 50 may also control further valves, such as valves of a bypass valve arrangement, via which, for example in a disinfection process, sensitive components can be circumvented, in such a way that the sensitive components, such as a water filter 2, do not come into contact with the disinfection agent. In this context, for example the two bypass valves 21, 23 may be switched in such a way that a disinfection agent which flows in via the fresh water inlet pipe 10 does not flow via the partial length 12 of the fresh water supply pipe, in which for example a sensitive water filter 2 is arranged, but instead bypasses this partial length 12 via a bypass pipe 20. The water thus branches from the fresh water supply pipe 10 into the bypass pipe 20 at the branch point 13, as it were, and is guided back into the fresh water supply pipe again at the connection point 11, so as subsequently to be supplied to the corresponding taps 40, 41, 42 via the corresponding inlet branches 16. In this context the bypass valves 21, 23 may be three-way valves, in such a way that it can be ensured that the partial length 12 is hermetically sealed during a disinfection process, in such a way that no disinfection agent can reach the water filter 2, even by diffusion.

The control device 50 may further control a corresponding drain valve 92, which for example makes it possible to drain the fresh water pipe system automatically, so as subsequently to fill the fresh water system with a corresponding disinfection solution. The discharged fresh water is subsequently supplied via the discharge valve 92 to a discharge pipe 95, which is connected to the waste water tank via a corresponding discharge valve 93.

So as to ensure that the valves 21, 23, 30, 31, 32, 92 not only can be controlled correctly, but also actually open, a corresponding monitoring device 70 may be arranged at the respective valves, and reports the valve position back to the control device or the logging device 55. In this way, it can be ensured or even checked retrospectively whether the valves have actually opened correctly and a disinfection process has been carried out properly.

Moreover, a detection means 80 may be provided in the fresh water inlet branch, which detects automatically or else by means of manual input that a corresponding pipe treatment agent is flowing into the fresh water supply system, so as in this way to send a report back to the control device 50, which subsequently carries out a corresponding valve control for a pipe treatment process on the basis of this detection signal.

In this way, it can be provided that the disinfection is controlled by means of a central control unit 50, which is connected via data transmission to the fresh water system, the valves and the fresh water consumers in the on-board kitchen or the aircraft toilets. Once the fresh water system of the aircraft is externally connected to a source comprising disinfection solution or descaling solution, the fresh water system and the on-board kitchens can initially be filled automatically with the treatment solution, in that the inlet-side valves of the on-board kitchens and the sanitary means are opened by means of a signal, proceeding from the control device 50, to such an extent that the disinfection solution or descaling solution flows into the fresh water system. If corresponding sensitive devices, such as water filters 2, are provided, they may be circumvented by a corresponding detour, in such a way that complex installation and removal of these sensitive elements is not necessary in a maintenance process. These elements, which do not come into contact with a disinfection solution during the normal disinfection process, may be disinfected in a different manner, for example using an antibacterial silver coating or the like. When the system is refilled with fresh water after the treatment, the corresponding bypass valves 21, 23 can be switched again, in such a way that in the normal case there is flow through the water filter via the partial pipe 12, that is to say water no longer flows via the bypass pipe 20. Before disinfection, all of the fresh water may for example be discharged via a corresponding drain valve 92, so as to empty the entire fresh water pipe. For this purpose, the aeration valve 60 for example may be opened. Subsequently, the disinfection or descaling agent is fed in via the fresh water pipe 10 by means of the corresponding liquid pressure, and fills the entire system with the corresponding treatment agent. For this purpose, the corresponding tap valves 30, 31, 32 are opened automatically, until the corresponding disinfection solution is present at the tap. The opening duration of the valves 30, 31, 32 which is required for this purpose may for example be determined empirically and stored in the subordinate control device 51, 52, but may also be monitored by way of a corresponding detection device in the corresponding pipe branches 60, in such a way that the valves 30, 31, 32 only close again when it is also detected that there is a corresponding treatment solution in the corresponding branch. The corresponding valves may be controlled in a particular sequence, so as to control the pressure level and to reduce the maximum flow. On the input side of the system, for safety, the fresh water pipe of the on-board kitchen may comprise a manual shut-off valve 94, which normally remains open, and can be shut manually as a back-up in case of error so as to prevent flooding of the on-board kitchen. If a treatment liquid is selected for which a significant difference in effect is to be expected when it is heated or cooled, it can be brought about by means of the control system that corresponding temperature-control devices 45 are deactivated so as for example to prevent corrosion or freezing.

The amount of disinfection agent which flows through should be selected in such a way that on the one hand the disinfection effect can be provided, but on the other hand sufficient discharge into the waste water system via the collection tanks 91 can also be ensured. The maximum flow may additionally be reduced in that the consumers are flushed in a fixed sequence, which may also be controlled by the control device 50 or 51, 52. When the system is completely filled with a corresponding treatment solution, the valves can be shut off, in such a way that the entire system is flooded with the treatment solution, which can accordingly act. After the action time has elapsed, the disinfection solution may subsequently either be discharged through the waste water system or be collected in the kitchen appliances by means of corresponding collection tanks. For this purpose, the inlet-side valves of the on-board kitchens 30, 31, 32 or all of the valves in the kitchen appliances are completely opened by the control device 50. It must be provided that the entire fresh water system, including all of the consumers, can be drained completely, and no residual amounts of liquid are left behind. On the output side of the on-board kitchen, a return valve 93 for example may prevent grey water from flowing back into the on-board kitchen region.

Repeating the disinfection procedure or treatment procedure and subsequently repeatedly rinsing the system may also be carried out in an automated manner as described above. The individual operating steps which are to be carried out in this context are similar in principle, but may be different in individual cases, in particular in relation to the opening times and opening sequence. In this context, the number of repetition steps may also optionally be controlled by a sensor system, which determines the concentration of disinfection solution in the water system. This ensures that the system is rinsed sufficiently so as to observe the required fresh water quality.

Figure 2:
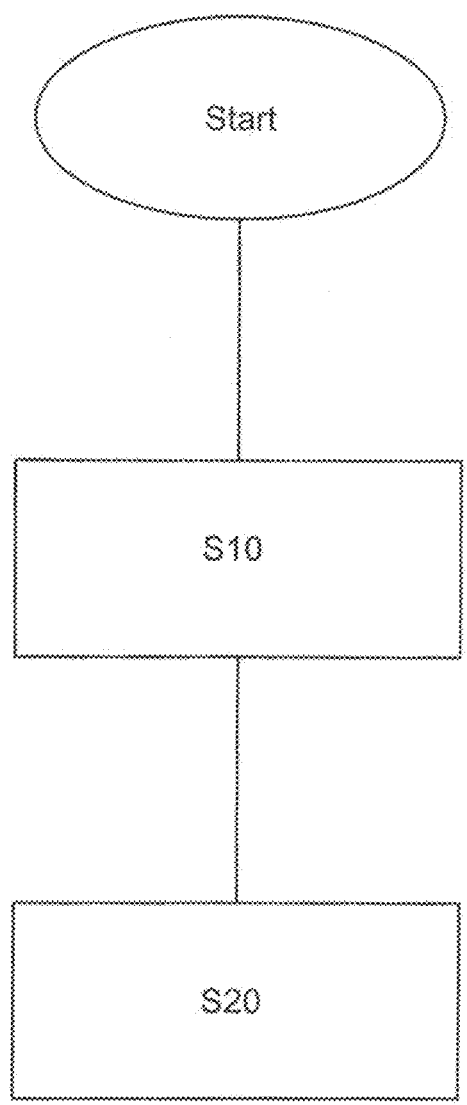
FIG. 2 shows an exemplary embodiment of the method according to the various teachings of the present disclosure.

FIG. 2 shows an embodiment of the method according to the various teachings of the present disclosure for pipe treatment in a supply unit, the method comprising detecting a pipe treatment signal S10 and controlling S20 a plurality of controllable tap valves 30, on the basis of the detected pipe treatment signal, so as to place each of the tap valves in a pipe treatment state, the respective tap valve being controlled in such a way that the respective tap valve is opened for a particular duration and to a particular degree in accordance with a respective opening pattern.

It should be noted that the various teachings of the present disclosure can be used not only in aircraft, but also in other mobile and stationary systems. An intended use similar to that in aircraft occurs for example in trains or ships. However, a pipe treatment which is automated in this manner may for example also be used in public sanitation facilities so as to be able to observe the corresponding hygiene standards.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the present disclosure as set forth in the appended claims and their legal equivalents.

What is claimed is:

1. A pipe treatment system for a supply unit, the pipe treatment system comprising:
    a fresh water inlet pipe;
    a tap for fresh water;
    a controllable tap valve arranged between the fresh water inlet pipe and the tap for fresh water;
    a control device for controlling the pipe treatment system, connected to the controllable tap valve to place the controllable tap valve in a pipe treatment state based on a pipe treatment signal at the control device;
    a bypass pipe arranged parallel to at least a partial length of the fresh water inlet pipe; and
    a controllable bypass valve arrangement configured and controllable in such a way that a liquid feed is bypassed through the bypass pipe at the partial length of the fresh water inlet pipe,
    wherein the control device for controlling the pipe treatment system is connected to the controllable bypass valve arrangement to place the controllable bypass valve arrangement in a pipe treatment state when the pipe treatment signal is at the control device, so as to completely bypass the liquid feed through the bypass pipe at the partial length of the fresh water inlet pipe;
    wherein the bypassed partial length of the fresh water inlet pipe is hermetically sealed in the pipe treatment state such that no liquid can enter the bypassed partial length of the fresh water inlet pipe;
    wherein the pipe treatment system comprises a plurality of taps for fresh water and a plurality of controllable tap valves, each one of the plurality of controllable tap valves being arranged between the fresh water inlet pipe and a correspondingly associated one of the plurality of taps for fresh water, the control device comprising a plurality of subordinate control devices, one of the plurality of subordinate control devices being assigned to each one of the plurality of taps for fresh water, a respective controllable tap valve being connected to and controllable by a respective subordinate control device such that the respective controllable tap valve is opened for a duration and to a degree in accordance with an opening pattern;

wherein the plurality of subordinate control devices are configured to take into account a relative position of the tap and/or the inlet length thereof;

wherein the controllable bypass valve arrangement comprises a first bypass valve and a second bypass valve, wherein the first bypass valve is arranged at a branch point, and the second bypass valve is arranged at a connection point of the fresh water inlet pipe;

wherein the pipe treatment system further comprises a water filter arranged between the first bypass valve and the second bypass valve;

wherein the fresh water supply pipe is configured such that water branches into the bypass pipe at the branch point and is guided back into the fresh water supply pipe at the connection point, to be supplied to corresponding taps via corresponding inlet branches; and wherein the first bypass valve and the second bypass valve hermetically seal a partial length of the fresh water supply pipe between the branch point and the connection point during a disinfection process such that no disinfection agent can reach the water filter by diffusion.

2. The pipe treatment system according to claim 1, wherein the pipe treatment system further comprises a ventilation valve, the ventilation valve being arranged in a branch of the fresh water inlet pipe, the branch of the fresh water inlet pipe arranged parallel to a branch of the fresh water inlet pipe in which branch the controllable tap valve is positioned, the ventilation valve being configured for bleeding of the fresh water inlet pipe.

3. The pipe treatment system according to claim 1, wherein the control device comprises a subordinate control device, which is allocated to the tap for fresh water, the controllable tap valve being connected to and controllable by the subordinate control device in such a way that the controllable tap valve is opened for a particular duration and to a particular degree, in accordance with an opening pattern.

4. The pipe treatment system according to claim 1, wherein the tap for fresh water comprises a controllable temperature-control device, the temperature-control device being connected to and controllable by the control device in such a way that the temperature-control device is deactivated based on the pipe treatment signal.

5. The pipe treatment system according to claim 1, wherein the control device comprises a logging device, which displays a progression of control signals over time.

6. The pipe treatment system according to claim 1, wherein at least one of the first bypass valve, the second bypass valve and the controllable tap valve comprises a valve-state detection means, which is connected to the control device, the control device comprising a logging unit which displays a progression of valve states over time.

7. The pipe treatment system according to claim 1, wherein the control device has a stored pipe treatment sequence, which automatically controls the progression over time of valve opening degrees of the controllable bypass valve arrangement and the controllable tap valve when there is a pipe treatment signal.

8. The pipe treatment system according to claim 1, wherein the pipe treatment system comprises a detection means, which is configured to detect the presence of a pipe treatment agent in the fresh water inlet pipe, and to transmit the pipe treatment signal to the control device in response to the presence of a pipe treatment agent.

9. The pipe treatment system according to claim 1, wherein the pipe treatment system is configured for a pipe treatment with at least one of a disinfection agent and a descaling agent.

10. An aircraft, comprising:
at least one supply unit from the group consisting of a kitchen installation, a toilet installation and a bath installation;
a pipe treatment system for the at least one supply unit, the pipe treatment system including:
a fresh water inlet pipe;
a tap for fresh water;
a controllable tap valve arranged between the fresh water inlet pipe and the tap for fresh water;
a control device for controlling the pipe treatment system connected to the controllable tap valve to place the tap valve in a pipe treatment state based on a pipe treatment signal at the control device;
a bypass pipe arranged parallel to at least a partial length of the fresh water inlet pipe; and
a controllable bypass valve arrangement configured and controllable in such a way that a liquid feed is bypassed through the bypass pipe at the partial length of the fresh water inlet pipe,
wherein the control device for controlling the pipe treatment system is connected to the controllable bypass valve arrangement to place the controllable bypass valve arrangement in a pipe treatment state when the pipe treatment signal is at the control device, so as to completely bypass the liquid feed through the bypass pipe at the partial length of the fresh water inlet pipe;
wherein the bypassed partial length of the fresh water inlet pipe is hermetically sealed in the pipe treatment state such that no liquid can enter the bypassed partial length of the fresh water inlet pipe;
wherein the pipe treatment system comprises a plurality of taps for fresh water and a plurality of controllable tap valves, each one of the plurality of controllable tap valves being arranged between the fresh water inlet pipe and a correspondingly associated one of the plurality of taps for fresh water, the control device comprising a plurality of subordinate control devices, one of the plurality of subordinate control devices being assigned to each one of the plurality of taps for fresh water, a respective controllable tap valve being connected to and controllable by a respective subordinate control device such that the respective controllable tap valve is opened for a duration and to a degree in accordance with an opening pattern;
wherein the plurality of subordinate control devices are configured to take into account a relative position of the tap and/or the inlet length thereof;
wherein the controllable bypass valve arrangement comprises a first bypass valve and a second bypass valve, wherein the first bypass valve is arranged at a branch point, and the second bypass valve is arranged at a connection point of the fresh water inlet pipe;
wherein the pipe treatment system further comprises a water filter arranged between the first bypass valve and the second bypass valve;
wherein the fresh water supply pipe is configured such that water branches into the bypass pipe at the branch point and is guided back into the fresh water supply pipe at the connection point, to be supplied to corresponding taps via corresponding inlet branches; and
wherein the first bypass valve and the second bypass valve hermetically seal a partial length of the fresh water supply pipe between the branch point and the connection point during a disinfection process such that no disinfection agent can reach the water filter by diffusion.

11. The aircraft according to claim 10, wherein the pipe treatment system further comprises a ventilation valve, the ventilation valve being arranged in a branch of the fresh water inlet pipe, the branch of the fresh water inlet pipe arranged parallel to a branch of the fresh water inlet pipe in which branch the controllable tap valve is positioned, the ventilation valve being configured for bleeding of the fresh water inlet pipe.

12. The aircraft according to claim 10, wherein the tap for fresh water comprises a controllable temperature-control device, the temperature-control device being connected to and controllable by the control device in such a way that the temperature-control device is deactivated with the receipt of the pipe treatment signal.

13. The aircraft according to claim 10, wherein the pipe treatment system comprises a detection means, which is configured to detect the presence of a pipe treatment agent in the fresh water inlet pipe, and to transmit the pipe treatment signal to the control device in response to the presence of a pipe treatment agent.

14. The aircraft according to claim 10, wherein the pipe treatment system is configured for a pipe treatment with at least one of a disinfection agent and a descaling agent.

15. A pipe treatment system for a supply unit, the pipe treatment system comprising:
a fresh water inlet pipe;
a tap for fresh water;
a controllable tap valve between the fresh water inlet pipe and the tap for fresh water;
a control device connected to the controllable tap valve to place the controllable tap valve in a pipe treatment state based on a pipe treatment signal at the control device;
a bypass pipe that is parallel to at least a partial length of the fresh water inlet pipe;
a controllable bypass valve arrangement configured and controllable to bypass a liquid feed through the bypass pipe at the partial length of the fresh water inlet pipe, the controllable bypass valve arrangement comprising a first bypass valve and a second bypass valve, the first bypass valve arranged at a branch point, and the second bypass valve arranged at a connection point of the fresh water inlet pipe; and
a water filter between the first bypass valve and the second bypass valve;
wherein the control device is connected to the controllable bypass valve arrangement to place the controllable bypass valve arrangement in a pipe treatment state when the pipe treatment signal is at the control device, so as to completely bypass the liquid feed through the bypass pipe at the partial length of the fresh water inlet pipe;
wherein the bypassed partial length of the fresh water inlet pipe is hermetically sealed in the pipe treatment state such that no liquid can enter the bypassed partial length of the fresh water inlet pipe;
wherein the fresh water supply pipe is configured such that water branches into the bypass pipe at the branch point and is guided back into the fresh water supply pipe at the connection point, to be supplied to corresponding taps via corresponding inlet branches; and
wherein the first bypass valve and the second bypass valve hermetically seal a partial length of the fresh water supply pipe between the branch point and the connection point during a disinfection process such that no disinfection agent can reach the water filter by diffusion.

* * * * *